(12) United States Patent
Zeng et al.

(10) Patent No.: US 11,264,665 B1
(45) Date of Patent: Mar. 1, 2022

(54) BATTERY HOUSINGS FOR ACCOMMODATING SWELLING OF ELECTRODE ASSEMBLIES

(71) Applicant: Apple Inc., Cupertino, CA (US)

(72) Inventors: Qingcheng Zeng, San Jose, CA (US); Donald G. Dafoe, San Jose, CA (US); Kenzo Nagai, Fremont, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 16/850,481

(22) Filed: Apr. 16, 2020

Related U.S. Application Data

(63) Continuation of application No. 16/117,096, filed on Aug. 30, 2018, now Pat. No. 10,658,632.

(60) Provisional application No. 62/562,842, filed on Sep. 25, 2017.

(51) Int. Cl.
*H01M 4/02* (2006.01)
*H01M 50/147* (2021.01)
*H01M 50/183* (2021.01)

(52) U.S. Cl.
CPC ....... *H01M 50/147* (2021.01); *H01M 50/183* (2021.01); *H01M 2200/00* (2013.01)

(58) Field of Classification Search
CPC ...................................................... H01M 4/02
See application file for complete search history.

(56) References Cited

U.S. PATENT DOCUMENTS

| | | |
|---|---|---|
| 2005/0069760 A1* | 3/2005 | Somatomo .......... H01M 50/325 429/56 |
| 2011/0177377 A1 | 7/2011 | Dube |
| 2015/0010797 A1 | 1/2015 | Kim |
| 2015/0221995 A1 | 8/2015 | Robert et al. |

* cited by examiner

*Primary Examiner* — Jacob B Marks
(74) *Attorney, Agent, or Firm* — BakerHostetler (57) ABSTRACT

Battery housings and batteries are presented for accommodating swelling of an electrode assembly. In one aspect, a battery includes an electrode assembly that includes a cathode and an anode. The battery also includes a receptacle that includes at least one feedthrough disposed through one or more sides of the receptacle. A lid is sealed to the receptacle. The receptacle, the at least one feedthrough, and the lid form a sealed volume in which the electrode assembly and an electrolyte are disposed. The lid is configured to displace from a first position to a second position in response to a swelling of the electrode assembly within the sealed volume. The receptacle is configured to strain less than the lid during the swelling of the electrode assembly. The second position of the lid may correspond to an expanded volume of the electrode assembly that is 15% greater than an initial volume.

20 Claims, 6 Drawing Sheets

BATTERY HOUSINGS FOR ACCOMMODATING SWELLING OF ELECTRODE ASSEMBLIES

PRIORITY

This application is a continuation of U.S. patent application Ser. No. 16/117,096, entitled "BATTERY HOUSINGS FOR ACCOMMODATING SWELLING OF ELECTRODE ASSEMBLIES," filed on Aug. 30, 2018, which claims the benefit under 35 U.S.C. § 119(e) of U.S. Provisional Patent Application Ser. No. 62/562,842, entitled "BATTERY HOUSINGS FOR ACCOMMODATING SWELLING OF ELECTRODE ASSEMBLIES," filed on Sep. 25, 2017, each of which is incorporated herein by reference in its entirety.

FIELD

This disclosure relates generally to housing for enclosing battery cells, and more particularly, to battery housing for accommodating swelling of electrode assemblies.

BACKGROUND

A battery stores and releases electrical energy by relying on the chemical diffusion of ions between an anode electrode and a cathode electrode. During storage of electrical energy, ions flow from the cathode electrode to the anode electrode in response to a voltage potential placed across the battery's terminals. Conversely, during release of electrical energy, ions flow from the anode electrode to the cathode electrode as the battery drives current through an electrical load battery. An electrolyte serves as a transport medium to facilitate chemical diffusion between the anode electrode and the cathode electrode.

The battery employs an electrode assembly to control chemical diffusion between the anode electrode and the cathode electrode. The electrode assembly includes a separator disposed between the anode electrode and the cathode electrode. The separator serves to isolate the anode electrode from the cathode electrode and provides a permeable matrix through which the electrolyte (and ions therein) can diffuse. However, repeated storage and release of electrical energy from the battery may induce the electrode assembly to irreversibly swell. Such swelling may be caused by chemical changes in the electrode assembly, the electrolyte, or both. Battery housings are desired that can accommodate swelling of an electrode assembly.

SUMMARY

In one aspect, a battery includes an electrode assembly that includes a cathode and an anode. The battery also includes a receptacle that includes at least one feedthrough disposed through one or more sides of the receptacle. A lid is sealed to the receptacle. The receptacle, the at least one feedthrough, and the lid form a sealed volume in which the electrode assembly and an electrolyte are disposed. The lid is configured to displace from a first position to a second position in response to a swelling of the electrode assembly within the sealed volume. The receptacle is configured to strain less than the lid during the swelling of the electrode assembly. The second position of the lid may correspond to an expanded volume of the electrode assembly that is 15% greater than an initial volume. In further embodiments, the electrode assembly and the lid are separated by a gap no greater than 15% of an initial thickness of the electrode assembly.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

A description of various embodiments will now be made with reference to the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

An electrode assembly of a lithium-ion battery cell may swell in response to cycles of charging and discharging. Swelling of the electrode assembly may result from dimensional changes in the anode and cathode active materials of the electrode assembly. Such active materials are operable to store and release lithium ions via an electrochemical process that alters spacing within their crystalline structures. Swelling of the electrode assembly may also result from the decomposition of electrolyte in the electrode assembly. This decomposition may introduce new chemical species into the electrolyte, increasing its volume and possibly liberating gaseous species. Over an operational lifetime, the electrode assembly may expand by up to 20 percent relative to its initial volume.

Conventional battery housings are poorly suited to accommodate swelling of an electrode assembly. Conventional battery housings are commonly fabricated with rigid metal walls (e.g., a metal can), which constrain swelling of the electrode assembly. As a result, swelling of the electrode assembly induces high stresses within the rigid metal walls, placing such housings at risk for rupture. Moreover, swelling of the electrode assembly may cause layers thereof, i.e., layers associated with an anode electrode, a cathode electrode, and a separator, to shift and drag against the rigid metal walls. This shifting or dragging may create folds or wrinkles in the electrode assembly, perturbing its configuration and reducing its performance (e.g., reducing storage capacity over time).

To account for swelling of an electrode assembly enclosed within a battery housing, the battery housing may include "head space" (e.g., available and unoccupied volume). Head space, however, reduces packaging efficiency and decreases volumetric capacity of the battery. Incorporating head space in a battery housing, may therefore, be suboptimal. Alternatively, the battery housing may be manufactured from pliable materials (e.g., flexible pouch) that are configured to deform in response to swelling of the electrode assembly. Flexible pouches may expand in various directions, which may in turn compromise the integrity of the battery housing should it contact other components with sharp edges or corners.

The embodiments described herein relate to battery housings for accommodating swelling of an electrode assembly, and batteries employing such housings. Controlled expansion allows the electrode into an area of the battery that can accommodate the overflow. The battery housings include a lid sealed to a receptacle that allows controlled expansion of an electrode assembly during swelling. The receptacle includes at least one feedthrough disposed through one or more sides of the receptacle. The lid is configured to accommodate swelling of the electrode assembly, which in some embodiments, involves displacing from a first position to a second position. This displacement increases a sealed volume formed by the receptacle, the at least one feedthrough, and the lid. The electrode assembly and an electrolyte are disposed within the sealed volume.

As used herein, the term "electrode assembly" refers to an anode electrode (or anode) and a cathode electrode (or cathode) having a separator disposed therebetween. The anode electrode includes an anode current collector having an anode active material disposed thereon. The cathode electrode includes a cathode current collector having a cathode active material disposed thereon. The "electrode assembly" may include a stack of layers, i.e., layers associated with the anode current collector and corresponding anode active material, the cathode current collector and corresponding cathode active material, and the separator. The stack of layers may be in a planar configuration (e.g., flat) or may be wrapped into a wound configuration (e.g., a "jelly roll"). A conductive tab may be coupled to each of the anode electrode and the cathode electrode (or individual layers associated with the anode current collector or cathode current collector).

As used herein, the term "strain" refers to the dimensional change of a body in response to a stress ($\sigma$), pressure (P), or force (F). "Strain" ($\varepsilon$) may be quantified using a percent that is defined according to $\varepsilon=(d_f-d_i)/d_i*100\%$. Here, $d_f$ corresponds to the magnitude of a dimension when the stress, pressure, or force is applied to the body; and $d_i$ corresponds to the magnitude of the dimension when no stress, pressure or force is applied to the body. It will be recognized that $d_f-d_i$ represents the elongation (or contraction) of the dimension when the stress, pressure, or force is applied to the body. Non-limiting examples of the dimension include a width, a depth, and a height of a battery housing. Non-limiting examples of the stress, pressure, or force include those resulting from swelling of an electrode assembly within the battery housing. The battery housing may seal the electrode assembly therein.

Figure 1A:
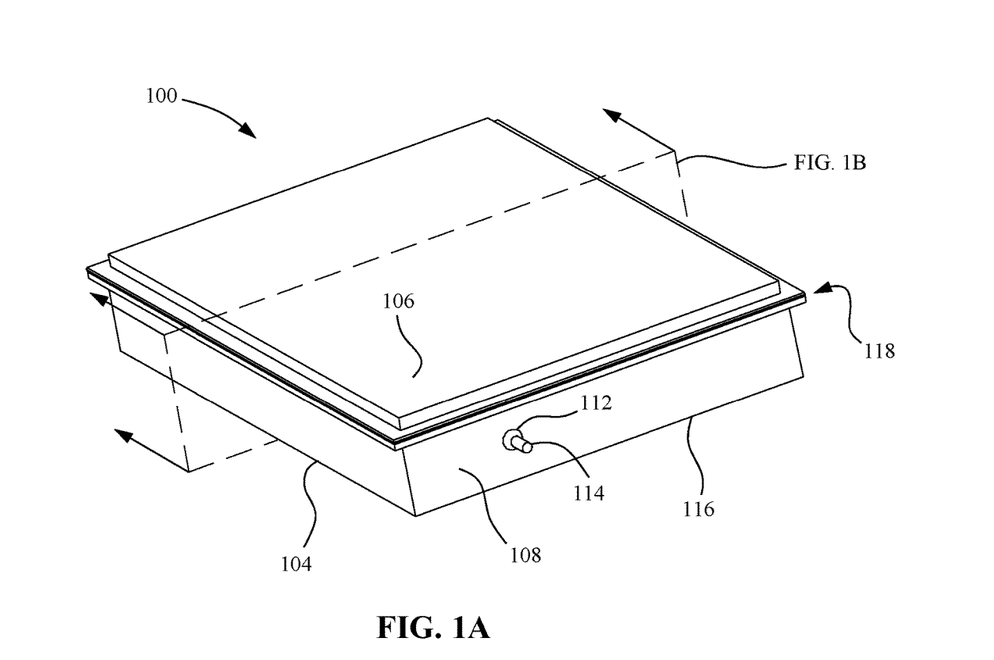
FIG. 1A is a perspective view is presented of a battery housing for accommodating swelling of an electrode assembly, according to an illustrative embodiment.
Figure 1B:
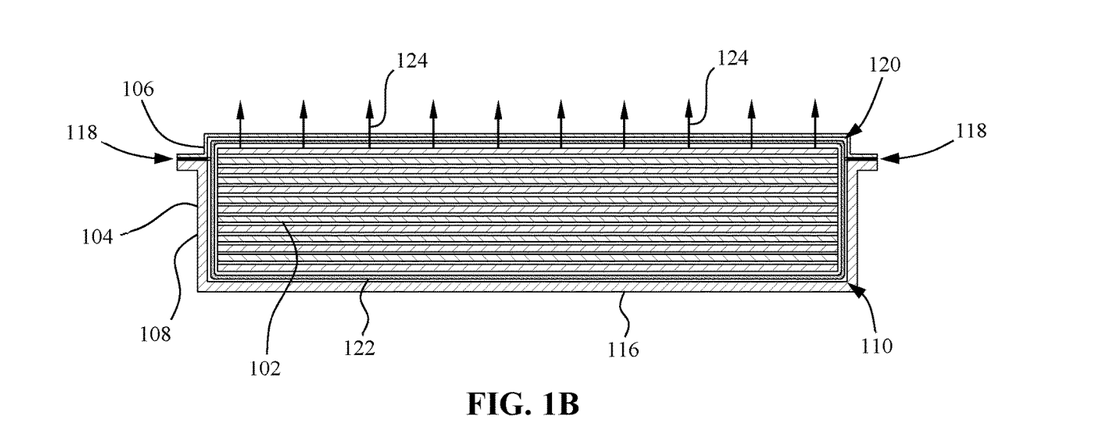
FIG. 1B is a cross-sectional view of the battery housing of FIG. 1A, according to an illustrative embodiment.

Now referring to FIG. 1A, a perspective view is presented of a battery housing 100 for accommodating swelling of an electrode assembly 102, according to an illustrative embodiment. FIG. 1B presents a cross-sectional view of the battery housing 100 of FIG. 1A, according to an illustrative embodiment. It will be understood that the battery housing 100 and electrode assembly 102 shown in FIGS. 1A and 1B may correspond to a battery, such as an alkaline battery, a zinc-carbon battery, a silver-zinc battery, a nickel-cadmium battery, a nickel-metal hydride battery, a lithium-ion battery, a lithium polymer battery, and so forth.

The battery housing 100 includes a receptacle 104 and a lid 106 that are collectively operable to enclose the electrode assembly 102. The receptacle 104 may include a side wall 108 encircling an open space 110 for containing the electrode assembly 102. The receptacle 104 also includes an orifice 112 disposed through the side wall 108 and configured to receive a feedthrough 114, which may be an electrical feedthrough. Although FIG. 1A depicts the receptacle 104 as having only one feedthrough 114, this depiction is not intended as limiting. The receptacle 104 may include at least one feedthrough disposed through one or more sides (or walls) of the receptacle 104.

A base wall 116 may connect portions of the side wall 108 to define a bottom surface for the battery housing 100. The lid 106 is configured to cover the open space 110 and couple to the receptacle 104 through a seal 118. The seal 118, which may be a hermetic seal, is formed on the side wall 108 around the open space 110.

It will be appreciated that the lid 106 is sealed to the receptacle 104. As such, the receptacle, the feedthrough 114, and the lid 106 form a sealed volume in which the electrical assembly 102 and an electrolyte are disposed. A portion of the electrode assembly 102 may protrude out of the open space 110 and into a pocket 120 of the lid 106, as shown in FIGS. 1A & 1B. However, in other embodiments, the electrode assembly 102 is contained entirely within the open space 110 of the receptacle 104. For example, and without limitation, an outermost surface of the electrode assembly 102 (i.e., relative to the base wall 116) may be level with a distal surface of the side wall 108. Alternatively, the outermost surface of the electrode assembly 102 may be below the distal surface of the side wall 108. In such alternative embodiments, the lid 106 (or portions thereof) may extend into the open space 110.

The seal 118 may involve direct coupling of the lid 106 to the receptacle 104 (e.g., a friction fit), or in some variations, may employ a sealing compound to allow (or improve) such coupling. The sealing compound may be disposed between the receptacle 104 and the lid 106. Non-limiting examples of the sealing compound include a soldering alloy, a brazing alloy, an adhesive, a glue, an epoxy, and a polymer (e.g., polypropylene). Other types of sealing compounds are possible. In some embodiments, the seal 118 includes a polymer disposed on the side wall 108, which may be fusible. The polymer may allow the lid 106 to be coupled to the receptacle 104 via thermal, magnetic-pulse, or ultrasonic welding. Non-limiting examples of the polymer include polyethylene (PE), polypropylene (PP), polyethylene terephthalate (PET), and nylon (NL). The polymer may be in cast form, i.e., cast polyethylene (CPE), cast polypropylene (CPP), cast polyethylene terephthalate (CPET), and nylon (CNL). In some instances, the polymer includes polypropylene (or cast polypropylene).

It will be appreciated that the receptacle 104 and the lid 106 are configured such that swelling of the electrode assembly 102 displaces the lid 106 outward while leaving the receptacle 104 substantially unstrained, i.e., with a strain less than or equal to 0.1% (i.e., $\varepsilon \leq 0.1\%$). In general, the receptacle 104 is configured to strain less than the lid during swelling of the electrode assembly 102. Strains associated with the receptacle 104 and the lid 106 include those of width, depth, height, diameter, or radius. Other types strains are possible (e.g., shear, torsion, etc.). Accordingly, the walls of the receptacle 104 may be selected in material and thickness to resist pressure within the open space 110, and the lid 106 may be selected in material and thickness to displace under such pressure.

In some embodiments, the receptacle 104 is formed of aluminum or an aluminum alloy. Non-limiting examples of the aluminum alloy include 1100 aluminum alloy, 6063 aluminum alloy, and 7075 aluminum alloy. In some embodiments, the receptacle 104 is formed of carbon steel. Non-limiting examples of carbon steel include low-carbon steel (i.e., up to 0.30% carbon by weight), medium-carbon steel (i.e., 0.3-0.6% carbon by weight), and high-carbon steel (i.e., 0.6-1.0% carbon by weight). In some embodiments, the receptacle 104 is formed of stainless steel. Non-limiting examples of the stainless steel include SS304, SS316L, and SS630. In some embodiments, the receptacle 104 is formed of titanium or a titanium alloy. Non-limiting examples of the titanium alloy include Grade 5 titanium alloy and Grade 7 titanium alloy.

It will be appreciated that the receptacle 104 may be formed of a composite material. For example, and without limitation, the receptacle 104 may include a first material, which serves as an inner wall, and a second material, which serves as an outer wall. The first material may be steel (e.g., carbon steel, stainless steel, etc.) and the second material may be aluminum or an aluminum alloy. In another non-limiting example, the receptacle 104 may include ceramic fibers, glass fibers, organic fibers, or any combination thereof disposed within a polymer matrix. The ceramic fibers may include silicon carbide fibers, aluminum oxide fibers, carbon or graphitic fibers, carbon nanotubes, and boron fibers. The glass fibers may include A-glass, C-glass, E-CR-glass, D-glass, S-glass, T-glass, silica fibers, quartz fibers, and quartz. The organic fibers may include aramid fibers and polyester fibers. Other compositions for the ceramic fibers, the glass fibers, and the organic fibers are possible. The polymer matrix may include polyester resins, vinyl ester resins, epoxy resins, phenolic resins, polyether ketone (PEEK), polyphenylene sulfide (PPS), polysulfone, polyetherimide (PEI), and polyamide-imide (PAI). Other compositions for the polymer matrix are possible.

The receptacle 104 may include a wall having a thickness ranging from 0.2 mm to 5.0 mm. In some embodiments, the receptacle 104 includes a wall having a thickness no greater than 5.0 mm. In some embodiments, the receptacle 104 includes a wall having a thickness no greater than 4.0 mm. In some embodiments, the receptacle 104 includes a wall having a thickness no greater than 3.0 mm. In some embodiments, the receptacle 104 includes a wall having a thickness no greater than 2.5 mm. In some embodiments, the receptacle 104 includes a wall having a thickness no greater than 2.0 mm. In some embodiments, the receptacle 104 includes a wall having a thickness no greater than 1.5 mm. In some embodiments, the receptacle 104 includes a wall having a thickness no greater than 1.0 mm. In some embodiments, the receptacle 104 includes a wall having a thickness no greater than 0.7 mm. In some embodiments, the receptacle 104 includes a wall having a thickness no greater than 0.5 mm. In some embodiments, the receptacle 104 includes a wall having a thickness no greater than 0.3 mm.

In some embodiments, the receptacle 104 includes a wall having a thickness no less than 0.2 mm. In some embodiments, the receptacle 104 includes a wall having a thickness no less than 0.3 mm. In some embodiments, the receptacle 104 includes a wall having a thickness no less than 0.5 mm. In some embodiments, the receptacle 104 includes a wall having a thickness no less than 0.7 mm. In some embodiments, the receptacle 104 includes a wall having a thickness no less than 1.0 mm. In some embodiments, the receptacle 104 includes a wall having a thickness no less than 1.5 mm. In some embodiments, the receptacle 104 includes a wall having a thickness no less than 2.0 mm. In some embodiments, the receptacle 104 includes a wall having a thickness no less than 2.5 mm. In some embodiments, the receptacle 104 includes a wall having a thickness no less than 3.0 mm. In some embodiments, the receptacle 104 includes a wall having a thickness no less than 4.0 mm.

It will be understood that the upper and lower limits may be combined in any variation as above to define a range for the thickness. For example, and without limitation, the receptacle 104 may include a wall having a thickness no greater than 4.0 mm but no less than 2.5 mm. In another non-limiting example, the receptacle 104 may include a wall having a thickness no greater than 0.7 mm but no less than 0.3 mm. Other ranges are possible.

In some embodiments, the lid 106 includes a laminate comprising a metal layer and a polymer layer. The metal layer may be bonded to a polymer layer. The laminate may be less than 500 µm in thickness. The metal layer may serve as a barrier to molecular diffusion, such as diffusion by water molecules, oxygen, and so forth. Non-limiting examples of the metal layer include a layer of aluminum or an aluminum alloy, stainless steel, carbon steel, and titanium or a titanium alloy. The metal layer may range in thickness from 1 µm to 10 µm. Non-limiting examples of the polymer layer include a layer of polyethylene (PE), a layer of polypropylene (PP), a layer of polyethylene terephthalate (PET), and a layer of nylon (NL). The polymer layer may range in thickness from 20 µm to 100 µm and may be in cast form (e.g., cast polyethylene, cast polypropylene, etc.). In certain instances, the metal layer includes aluminum and the polymer layer includes polypropylene (or cast polypropylene). In these instances, the metal layer may range from 3 µm to 5 µm in thickness and the polymer layer may range from 40 µm to 80 µm in thickness.

In further embodiments, the polymer layer is a first polymer layer and the metal layer has a second polymer layer bonded thereto and opposite the first polymer layer, i.e., the metal layer is sandwiched between the first polymer layer and the second polymer layer. Non-limiting examples of the second polymer layer include a layer of polyethylene (PE), a layer of polypropylene (PP), a layer of polyethylene terephthalate (PET), and a layer of nylon (NL). The second polymer layer may range in thickness from 20 µm to 100 µm and may be in cast form (e.g., cast polyethylene, cast polypropylene, etc.). In some instances, the lid 106 includes a laminate having a layer of aluminum sandwiched between two layers of polypropylene (or cast polypropylene), i.e., PP/Al/PP, PP/Al/CPP, and CPP/Al/CPP.

It will be understood that, in embodiments where the lid 106 includes the laminate, one or both of the first polymer layer and the second polymer layer may be a stack of polymer layers. In these embodiments, a first layer in the stack of polymer layers is bonded to the metal layer. Moreover, one or more polymer layers in the stack of polymer layers may be in cast form. For example, and without limitation, the stack of polymer layers may be PET/PP with PET being bonded to the metal layer (i.e., the first layer includes PET). In another non-limiting example, the stack of polymer layers may be CPP/CPE/CPET with CPP being bonded to the metal layer. In still yet another non-limiting example, the stack of polymer layers may be NL/PET/CPP with NL bonded to the metal layer. Representative examples of laminates include PP/PET/Al/PP, CPP/PET/Al/CPP, PET/Al/PP/PE/PET, PET/AL/CPP/CPE/CPET, PET/Al/NL/PET/PP, and PET/Al/NL/PET/CPP. Other variations are possible.

In some embodiments, the lid 106 includes a material forming the seal 118 with the receptacle 104. For example, and without limitation, the lid 106 may include a polymer capable of fusing or adhering to the side wall 108 of the receptacle 104 (e.g., polypropylene). In another non-limiting example, the lid 106 may include a metal capable of being welded to the side wall 108 of the receptacle (e.g., aluminum). Other materials are possible.

In embodiments where the seal 118 includes the polymer disposed on the side wall 108, the polymer layer of the laminate may match, in composition, the polymer disposed on the side wall 108. For example, and without limitation, the polymer may include polypropylene and the polymer layer may also be polypropylene. One or both of the polymer and the polymer layer may be in cast form. If the polymer layer is a stack of polymer layers, the outermost layer may match the polymer in composition. For example, and without limitation, the polymer may include polypropylene (or cast polypropylene) and the polymer layer may be a stack of polymer layers corresponding to PET/Al/NL/PET/PP or PET/Al/NL/PET/CPP. Such matching may improve formation of the seal 118 during manufacturing and increase a strength of the seal 118.

In some embodiments, an insulator 122 is disposed between the electrode assembly 102 and one or both of the receptacle 104 and the lid 106. The insulator 122 is operable to electrically isolate the electrode assembly 102 from the receptacle 104, the lid 106, or both. The insulator 122 may be formed of a material having a dielectric strength of at least 10 kV/mm. In some instances, such as shown in FIGS. 1A & 1B, the insulator 122 may include a package enclosing the electrode assembly 102. The package may be formed of polyethylene terephthalate (PET). In other instances, the insulator 122 is disposed over an inner surface of the receptacle 104, the lid 106, or both. The insulator 122 may cover the inner surface in its entirety or a portion thereof.

It will be appreciated that the battery housing 100 employs a hybrid construction that includes rigid and flexible portions, i.e., the receptacle 104 and the lid 106, respectively. The hybrid construction allows the battery housing 100 to offer a spacious internal volume—greater than 10 mm in depth, if desired—while simultaneously accommodate swelling of the electrode assembly 102. Moreover, the hybrid construction allows the battery housing 100 to be manufactured with rapid, cost-efficient processes such as drawing processes, stamping processes, and low-temperature (<300° C.) welding. For example, and without limitation, the receptacle 104 may be deep drawn from a sheet of ductile material (e.g., a metal) such that the open space 110 has a depth of 10 mm or more. The lid 106, when including the laminate, may be coupled to the receptacle 104 via thermal, magnetic-pulse welding, or ultrasonic welding. Other low-temperature processes are possible.

In contrast, conventional pouch-type battery housings are manufactured from laminates using drawing processes that are restricted to depths less than 10 mm. Laminates lack sufficient mechanical strength to allow the formation of deep pockets without tearing (i.e., pockets greater 10 mm in depth). Thus, unless expensive forming processes are used, conventional pouch-type battery housings are limited to electrode assemblies less than 10 mm in thickness. Although conventional metal-type battery housings can be used to overcome this limitation, conventional metal-type battery housings are rigid and thus are poorly suited to accommodate the swelling of electrode assemblies. The battery housing 100 described herein overcomes both of these disadvantages by virtue of its hybrid construction. The receptacle 104 allows the battery housing 100 to enclose electrode assemblies thicker than 10 mm, while the lid 106 allows the battery housing 100 to accommodate swelling of the electrode assembly 102 (e.g., via displacement, flexure, etc.). Moreover, the battery housing 100 can be configured to enclose a plurality of electrode assemblies. In these variations, the battery housing 100 may correspond to a battery pack.

In operation, the battery housing 100 encloses the electrode assembly 102 within an internal volume (or sealed volume) defined by the receptacle 104, the lid 106, and the feedthrough 114. In particular, the electrode assembly 102 is seated within the open space 110, which is bounded by the side wall 108 and the base wall 116. The lid 106 is coupled to the receptacle 104 through the seal 118, thereby closing off the open space 110. The seal 118, which may be a hermetic seal, is formed on the side wall 108 around the open space 110. The seal 118 may include the polymer, which is disposed on the side wall 108. During enclosure of the electrode assembly 102, thermal, magnetic pulse, or ultrasonic welding may be used to form the seal 118 between the receptacle 104 and the lid 106. The polymer, if present, may improve a quality of the seal 118, such as a strength of the seal 118 and a leak rate of the seal 118.

Cycles of charging and discharging may induce the electrode assembly 102 to swell. It will be appreciated that the lid 106 is configured to accommodate a swelling of the electrode assembly 102 up to 15% in volume. During the swelling of the electrode assembly 102, the receptacle 104 is configured to strain less than the lid 106. In many embodiments, the receptacle 104 is configured to strain no greater than 0.1% (i.e., $\varepsilon \leq 0.1\%$) during swelling of the electrode assembly 102. This strain may be measured along principal dimensions of the receptacle 104. For rectangular embodiments, such as shown in FIGS. 1A & 1B, the principal directions may include a width, a depth, and a height of the receptacle 104. For spherical or cylindrical embodiments, the principal dimensions may include a diameter or a radius. Other principal dimensions are possible, depending on a configuration of the receptacle 104.

The receptacle 104 is operable to partially constrain the swelling of the electrode assembly 102 such that its expansion is directed towards the lid 106. Thus, the receptacle 104 serves to help control expansion of the electrode assembly 102 within the battery housing 10 during swelling. Such may be along one or more predetermined directions. FIGS. 1A & 1B depict the battery housing 100 as having a predetermined direction substantially perpendicular to the base wall 116 (see arrows 124) and out of the open space 110. However, this depiction is for purposes of illustration only. The lid 106 displaces outward in response to swelling of the electrode assembly 102. This displacement may, in certain instances, involve stretching or deformation of the lid 106, i.e., strain, but without rupture. As such, the lid 106 may be configured to displace from a first position to a second position as the electrode assembly 102 swells, thereby increasing the internal volume (or sealed volume). The second position may correspond to a position of the lid 106, beyond which, the structural integrity of the lid 106 may be compromised.

In some embodiments, the lid 106 displaces from the first position to the second position as the electrode assembly 102 swells from, respectively, an initial volume to an expanded volume. The initial volume may correspond to a volume of the electrode assembly 102 after being sealed within the battery housing 100, but having experienced no more than 5 charge and discharge cycles. In some embodiments, the lid 106 displaces from the first position to the second position as the electrode assembly 102 swells from, respectively, an intermediate volume to the expanded volume. The intermediate volume may correspond to a volume of the electrode assembly 102 after first swelling from the initial volume to fill the pocket 120 of the lid 106.

In some embodiments, the second position of the lid 106 corresponds to an expanded volume of the electrode assembly 102 that is 15% greater than an initial volume. In some embodiments, the second position of the lid 106 corresponds to an expanded volume of the electrode assembly 102 that is 12% greater than an initial volume. In some embodiments, the second position of the lid 106 corresponds to an expanded volume of the electrode assembly 102 that is 10% greater than an initial volume. In some embodiments, the second position of the lid 106 corresponds to an expanded volume of the electrode assembly 102 that is 8% greater than an initial volume. In some embodiments, the second position of the lid 106 corresponds to an expanded volume of the electrode assembly 102 that is 6% greater than an initial volume. In some embodiments, the second position of the lid 106 corresponds to an expanded volume of the electrode assembly 102 that is 4% greater than an initial volume. In some embodiments, the second position of the lid 106 corresponds to an expanded volume of the electrode assembly 102 that is 2% greater than an initial volume.

It will be understood that the initial, intermediate, and expanded volumes may be represented, respectfully, by initial, intermediate, and expanded thicknesses. For example, and without limitation, the second position of the lid 106 may correspond to an expanded thickness of the electrode assembly.

In some embodiments, the second position of the lid 106 corresponds to an expanded thickness of the electrode assembly 102 that is 15% greater than an initial thickness. In some embodiments, the second position of the lid 106 corresponds to an expanded thickness of the electrode assembly 102 that is 12% greater than an initial thickness. In some embodiments, the second position of the lid 106 corresponds to an expanded thickness of the electrode assembly 102 that is 10% greater than an initial thickness. In some embodiments, the second position of the lid 106 corresponds to an expanded thickness of the electrode assembly 102 that is 8% greater than an initial thickness. In some embodiments, the second position of the lid 106 corresponds to an expanded thickness of the electrode assembly 102 that is 6% greater than an initial thickness. In some embodiments, the second position of the lid 106 corresponds to an expanded thickness of the electrode assembly 102 that is 4% greater than an initial thickness. In some embodiments, the second position of the lid 106 corresponds to an expanded thickness of the electrode assembly 102 that is 2% greater than an initial thickness.

It will be appreciated that the seal 118 supports displacement of the lid 106 by maintaining coupling between the receptacle 104 and the lid 106. Accordingly, in some embodiments, the seal 118 is configured with a strength to support pressure within the battery housing 100 caused by swelling of the electrode assembly 102. Non-limiting examples of the strength include a tensile strength and a burst strength. The strength may be measured according to standards known to those skilled in the art (e.g., ASTM F88, ASTM F1140, ASTM F2054, etc.).

In some embodiments, the seal 118 has a burst strength of at least 50 kPa. In some embodiments, the seal 118 has a burst strength of at least 100 kPa. In some embodiments, the seal 118 has a burst strength of at least 250 kPa. In some embodiments, the seal 118 has a burst strength of at least 500 kPa. In some embodiments, the seal 118 has a burst strength of at least 750 kPa. In some embodiments, the seal 118 has a burst strength of at least 1000 kPa.

In some embodiments, the seal 118 has a burst strength no greater than 1250 kPa. In some embodiments, the seal 118 has a burst strength no greater than 1000 kPa. In some embodiments, the seal 118 has a burst strength no greater than 750 kPa. In some embodiments, the seal 118 has a burst strength no greater than 500 kPa. In some embodiments, the seal 118 has a burst strength no greater than 250 kPa. In some embodiments, the seal 118 has a burst strength no greater than 100 kPa.

It will be understood that the upper and lower limits may be combined in any variation as above to define a range for the burst strength. For example, and without limitation, the burst strength of the seal 118 may range from 50 kPa to 250 kPa. In another non-limiting example, the burst strength of the seal 118 may range from 500 kPa to 1000 kPa. Other ranges are possible.

In many embodiments, the battery housing 100 serves to hermetically enclose or seal the electrode assembly 102. In these embodiments, the receptacle 104, the lid 106, and the seal 118 are operable to prevent elements in an ambient environment of the battery housing 100 (e.g., dust, liquids, etc.) from entering the battery housing 100. Other components may also be involved (e.g., the feedthrough 114). The battery housing 100 also serves as a barrier to gaseous species that might otherwise diffuse through its structure. Non-limiting examples of such gaseous species include water vapor (or moisture) and oxygen. It will be appreciated that, when the lid 106 displaces in response to swelling of the electrode assembly 102, the battery housing 100 retains its ability to exclude elements from the ambient environment. The battery housing 100 also retains its barrier functionality to gaseous species.

In some embodiments, the battery housing 100 is configured to provide a helium leak rate no greater than $1\times10^{-3}$ standard $cm^3/s$. In some embodiments, the battery housing 100 is configured to provide a helium leak rate no greater than $1\times10^{-4}$ standard $cm^3/s$. In some embodiments, the battery housing 100 is configured to provide a helium leak rate no greater than $1\times10^{-5}$ standard $cm^3/s$. In some embodiments, the battery housing 100 is configured to provide a helium leak rate no greater than $1\times10^{-6}$ standard $cm^3/s$. In some embodiments, the battery housing 100 is configured to provide a helium leak rate no greater than $1\times10^{-7}$ standard $cm^3/s$.

In embodiments where the lid 106 includes the laminate, the laminate may have permeability represented by a helium leak rate. In some embodiments, the permeability of the laminate is no greater than $1 \times 10^{-5}$ standard cm³/s of helium. In some embodiments, the permeability of the laminate is no greater than $1 \times 10^{-6}$ standard cm³/s of helium. In some embodiments, the permeability of the laminate is no greater than $1 \times 10^{-7}$ standard cm³/s of helium. In some embodiments, the permeability of the laminate is no greater than $1 \times 10^{-8}$ standard cm³/s of helium. In some embodiments, the permeability of the laminate is no greater than $1 \times 10^{-9}$ standard cm³/s of helium.

In embodiments where the seal 118 includes a hermetic seal, the hermetic seal may also have a permeability represented by a helium leak rate. In some embodiments, the permeability of the hermetic seal is no greater than $1 \times 10^{-3}$ standard cm³/s of helium. In some embodiments, the permeability of the hermetic seal is no greater than $1 \times 10^{-4}$ standard cm³/s of helium. In some embodiments, the permeability of the hermetic seal is no greater than $1 \times 10^{-5}$ standard cm³/s of helium. In some embodiments, the permeability of the hermetic seal is no greater than $1 \times 10^{-6}$ standard cm³/s of helium. In some embodiments, the permeability of the hermetic seal is no greater than $1 \times 10^{-7}$ standard cm³/s of helium.

In FIGS. 1A-1B, the battery housing 100 is depicted as being rectangularly-shaped. However, this depiction is not intended as limiting. The battery housing 100 may have any shape that allows an electrode assembly to be disposed within an open space of a receptacle and be sealed therein by a lid. For example, and without limitation, the battery housing 100 may be cylindrically-shaped. In another non-limiting example, the battery housing 100 may have a top surface with a slope. In yet another non-limiting example, the battery housing 100 may include an inner side wall and an outer side wall. The inner and outer side walls may define a hole through the battery housing 100. In still yet another non-limiting example, one or both of the receptacle 104 or the lid 106 may have an indent disposed therein. Other configurations are possible. FIGS. 1A & 1B also depict the electrode assembly 102 as a stack of layers in a planar configuration. However, this depiction is for purposes of illustration only. The electrode assembly 102 may have other configurations, such as a wound configuration (e.g., a "jelly roll").

Figure 1C:
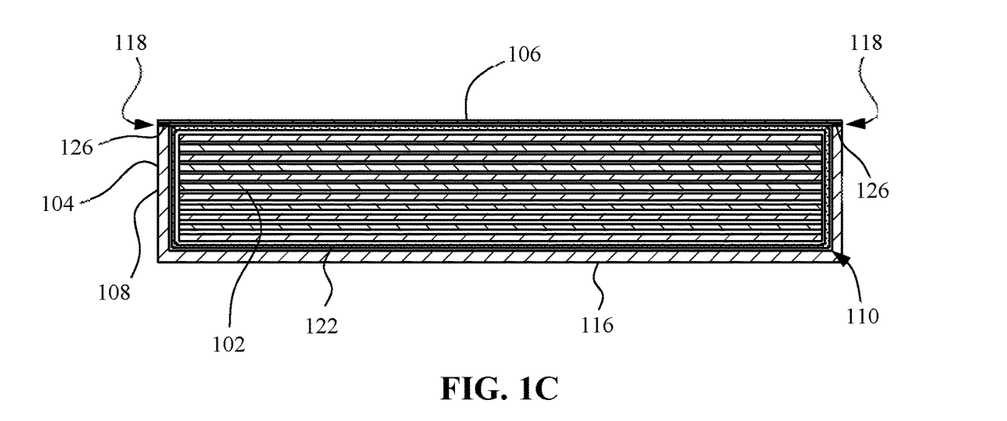
FIG. 1C presents a cross-sectional view of the battery housing of FIG. 1B, but in which a receptacle and a lid form a seal on an edge of a side wall, according to an illustrative embodiment.

Although the receptacle 104 and the lid 106 are shown in FIGS. 1A & 1B as having mating flanges to form the seal 118, other configurations of the receptacle 104 and the lid 106 are possible to form the seal 118. FIG. 1C presents a cross-sectional view of the battery housing 100 of FIG. 1B, but in which the receptacle 104 and the lid 106 form the seal 118 on an edge 126 of the side wall 108, according to an illustrative embodiment. Mating flanges are absent the receptacle 104 and the lid 106, and the electrode assembly 102 is contained entirely within the open space 110. Moreover, the lid 106 lacks a pocket (e.g., the pocket 120) and runs flat across the open space 110.

It will be understood that the edge 126 need not terminate in a flat surface, such as shown in FIG. 1C. For example, and without limitation, the edge 126 may have a protrusion extending therefrom that is narrower in thickness than the side wall 108. The protrusion may serve to increase a surface area of the edge 126, thereby increasing a surface area available for sealing. Non-limiting examples of cross-sections for the protrusion include hemispherical cross-sections and rectangular cross-sections. However, other types of cross-sections are possible.

Figure 1D:
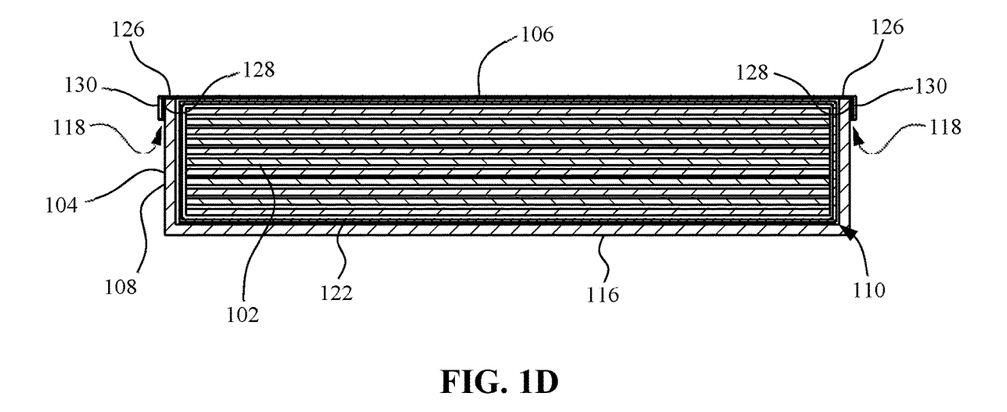
FIG. 1D is a cross-sectional view of the battery housing of FIG. 1B, but in which a receptacle and a lid form a seal on an exterior surface of a side wall, according to an illustrative embodiment.

The seal 118 may also involve exterior surfaces of the side wall 108. FIG. 1D presents a cross-sectional view of the battery housing 100 of FIG. 1B, but in which the receptacle 104 and the lid 106 form the seal 118 on an exterior surface 128 of the side wall 108, according to an illustrative embodiment. In these embodiments, the lid 106 is configured with a portion 130 that extends past the side wall 108 (e.g., a flap) and folds over the edge 126 to be disposed adjacent the exterior surface 128. Although not shown in FIG. 1D, the seal 118 may optionally include the edge 126.

Figure 1E:
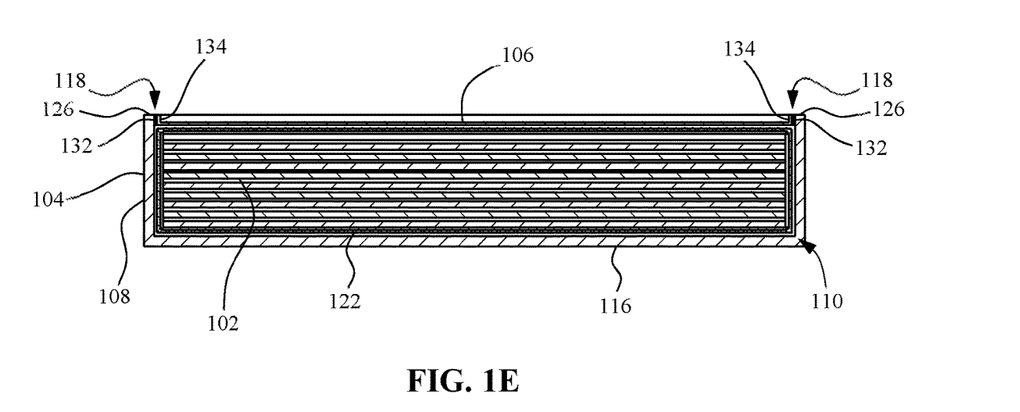
FIG. 1E is a cross-sectional view of the battery housing of FIG. 1B, but in which a receptacle and a lid form a seal on an interior surface of a side wall, according to an illustrative embodiment.

The seal 118 may additionally involve interior surfaces of the side wall 108. FIG. 1E presents a cross-sectional view of the battery housing 100 of FIG. 1B, but in which the receptacle 104 and the lid 106 form the seal 118 on an interior surface 132 of the side wall 108, according to an illustrative embodiment. In these embodiments, the electrode assembly 102 is below a distal surface of the side wall 108 (i.e., below the edge 126) and portions of the lid 106 extend into the open space 110. The lid 106 is configured with a portion 134 that is folded to be adjacent the interior surface 132 of the side wall 108.

It will be understood that, in general, the receptacle 104 and the lid 106 may be configured to form the seal 118 using any combination of edges, exterior surfaces, and interior surfaces of the side wall. Moreover, the receptacle 104 and the lid 106 are not limited to the representative configurations depicted by FIGS. 1A-1E. Other configurations are possible. For example, and without limitation, the lid 106 may include features to control a distribution of mechanical stress in the lid 106 during displacement. Such control may also reduce tensile and shear forces experienced by the seal 118 as well as prevent mechanical stress from concentrating within lid 106 to exceed a tensile strength threshold, a burst strength threshold, or a similar kind of threshold. Non-limiting examples of features for the lid 106 include corners with radiuses as well as cross-sectional profiles that involve arcs, ogee curves, chamfers, folds, creases, ripples, bellows, and undulations. These features may be disposed in any number and position on the lid 106 capable of controlling the distribution of mechanical stress during displacement.

Figure 1F:
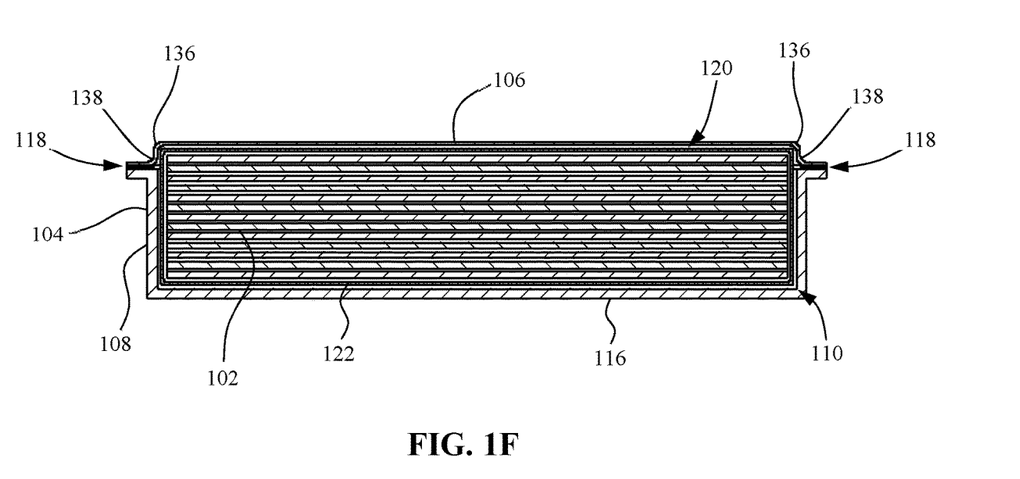
FIG. 1F presents a cross-sectional view of the battery housing of FIG. 1B, but in which a lid includes corners having radiuses, according to an illustrative embodiment.

For example, and without limitation, a cross-section of the lid 106 proximate the seal 118 may include an arc, a corner having a radius, or both. FIG. 1F presents a cross-sectional view of the battery housing 100 of FIG. 1B, but in which the lid 106 includes corners 136, 138 having radiuses, according to an illustrative embodiment. The radiuses may be increased in magnitude such that their respective corners yield an arc in cross-section. In FIG. 1F, each of an interior-facing corner 136 and an exterior-facing corner 138 is depicted in cross-section as having a radius. However, this depiction is not intended as limiting. In some instances, only one of the interior-facing corner 136 and the exterior-facing corner 138 has a radius.

Figure 1G:
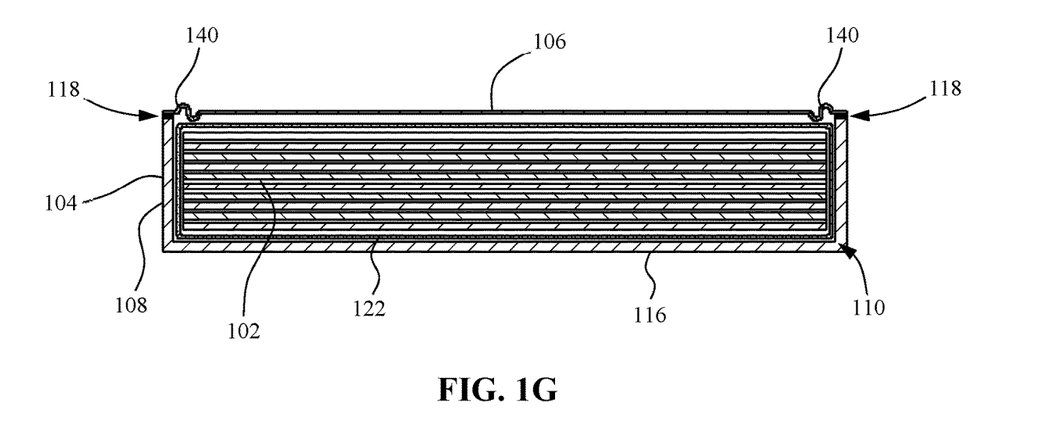
FIG. 1G presents a cross-sectional view of the battery housing of FIG. 1B, but in which the lid 106 includes an undulation, according to an illustrative embodiment.

In another non-limiting example, a cross-section of the lid 106 may include an undulation. FIG. 1G presents a cross-sectional view of the battery housing 100 of FIG. 1B, but in which the lid 106 includes an undulation 140, according to an illustrative embodiment. The undulation 106 is operable to fold additional portions of the lid 106 along a planar orientation thereof. This compact configuration unfolds during swelling of the battery assembly 102 and may allow the lid 106 to displace without transmitting significant mechanical stresses to the seal 118. In FIG. 1G, the undulation 140 is depicted as having a first portion protruding away from the open space 110 and a second portion protruding into the open space 110. However, this depicts is not intended as limiting. In some instances, the undulation 140 may include only a portion that protrudes away from the open space 110. In other instances, the undulation 140 may include a portion that protrudes into from the open space 110. FIG. 1G also depicts the undulation 140 as having a single repeat unit (i.e., a single instance of the first and second portions). However, this depiction is for purposes of illustration only. The undulation 140 may have any number of repeat units, and these repeat units may extend along any length or area of the lid 106.

Figure 1H:
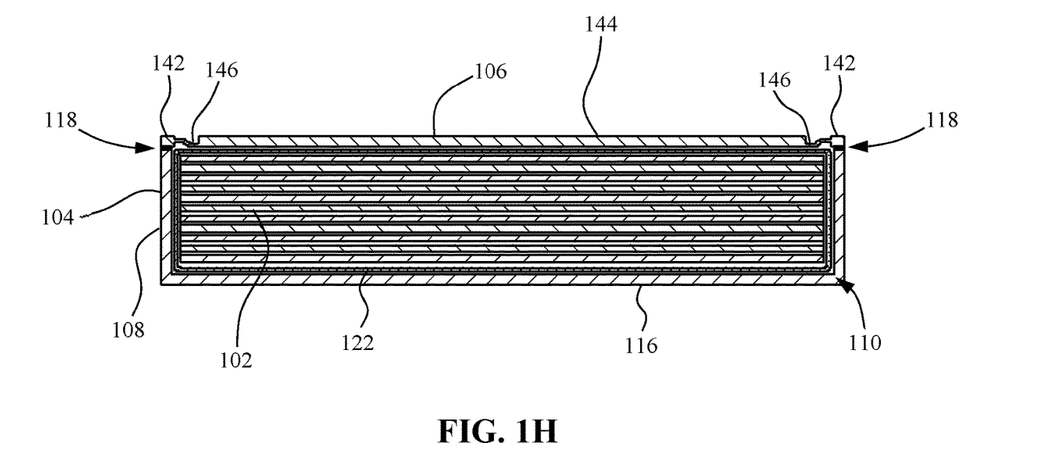
FIG. 1H presents a cross-sectional view of the battery housing of FIG. 1B, but in which the lid includes rigid portions and a flexible element proximate a seal, according to an illustrative embodiment.

It will be appreciated that features to control a distribution of mechanical stress may also allow the lid 106 to include rigid portions. In such variations, the features are operable to flex or bend during swelling of the electrode assembly 102 whereas the rigid portions remain substantially unstrained, i.e., have a strain less than or equal to 0.1% (i.e., $\varepsilon \leq 0.1\%$). FIG. 1H presents a cross-sectional view of the battery housing 100 of FIG. 1B, but in which the lid 106 includes rigid portions 142, 144 and a flexible element 146 proximate the seal 118, according to an illustrative embodiment. The flexible element 146 is configured to be mechanically weaker than the rigid portions 142, 144, thus allowing the lid 106 to displace in response to a pressure or a force from the electrode assembly 102. In FIG. 1H, the flexible element 146 is depicted in cross-section as an ogee curve. However, this depiction is not intended as limiting. Other types of flexible elements are possible such as creases, arcs, ripples, folds, bellows, undulations, and so forth. The flexible element 146 may also be formed via a scribe or indent in rigid portions of the lid 106.

The rigid portions 142, 144 may use materials and thicknesses described previously in relation to the receptacle 104. In many instances, the flexible element 146 shares a material in common with the rigid portions 142, 144 but is configured to be weaker mechanically than the rigid portions 142, 144. Such configuration may involve a shape or dimension (e.g., thickness). For example, and without limitation, both the receptacle 104 and the lid 106 may be formed of aluminum or an aluminum alloy. However, the flexible element 146 may be thinner than rigid portions 142, 144 of the lid 106, such as shown in FIG. 1H. In some embodiments, the flexible element 146 is no greater than 2 mm in thickness. In some embodiments, the flexible element 146 is no greater than 1.5 mm in thickness. In some embodiments, the flexible element 146 is no greater than 1.0 mm in thickness. In some embodiments, the flexible element 146 is no greater than 0.7 mm in thickness. In some embodiments, the flexible element 146 is no greater than 0.5 mm in thickness. In some embodiments, the flexible element 146 is no greater than 0.3 mm in thickness.

Figure 2A:
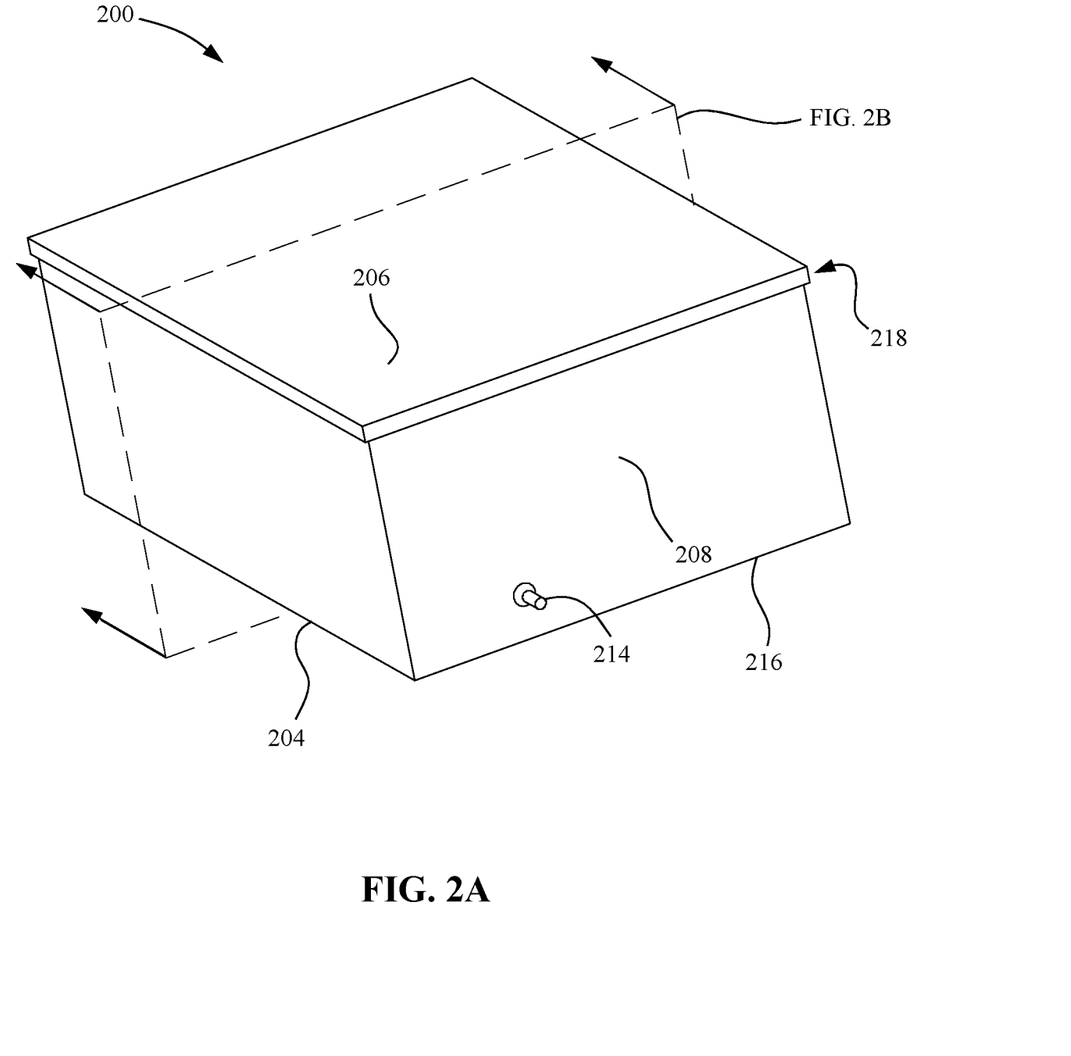
FIG. 2A presents a perspective view of a battery for accommodating swelling of an electrode assembly, according to an illustrative embodiment.
Figure 2B:
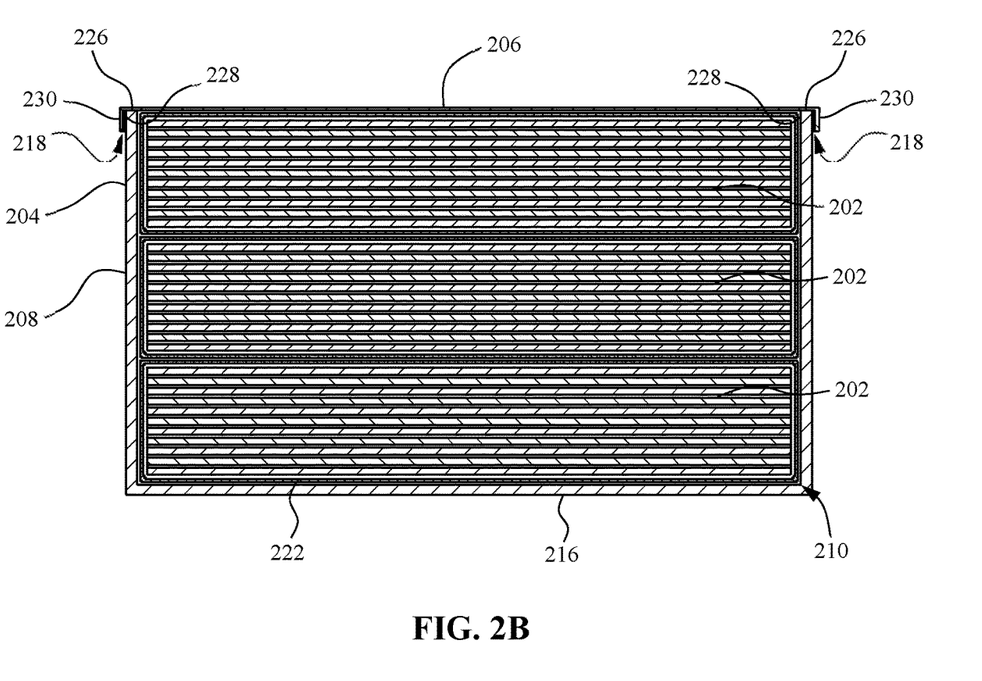
FIG. 2B presents a cross-sectional view of the battery of FIG. 2A, according to an illustrative embodiment.

Now referring to FIG. 2A, a perspective view is presented of a battery 200 for accommodating swelling of an electrode assembly 202, according to an illustrative embodiment. The battery 200 includes a receptacle 204 and a lid 206 operable to collectively enclose the electrode assembly 202. The lid 206 is sealed to the receptacle 204. FIG. 2B presents a cross-sectional view of the battery 200 of FIG. 2A, showing the electrode assembly 202. In FIG. 2B, three instances of the electrode assembly 202 are depicted as enclosed by the receptacle 204 and the lid 206. However, this depiction is not intended as limiting. The receptacle 204 and the lid 206 may collectively enclose any number and arrangement of electrode assemblies 202. In some embodiments, the battery 200 corresponds to a battery pack.

The receptacle 204 includes a side wall 208 encircling an open space 210 for containing the electrode assembly 202. A feedthrough 214 is disposed through the side wall 208. Although FIG. 2A depicts the receptacle 204 as having only one feedthrough 214, this depiction is not intended as limiting. The receptacle 204 may include at least one feedthrough disposed through one or more sides (or walls) of the receptacle 204.

A base wall 216 may further connect portions of the side wall 208 to define a bottom surface for the battery 200. The lid 206 covers the open space 210 and couples to the receptacle 204 through a seal 218. The receptacle 204, the feedthrough 214, and the lid 206 form a sealed volume in which the electrode assembly 202 and an electrolyte are disposed. In many embodiments, the lid 206 includes a laminate comprising a metal layer and a polymer layer. The metal layer may be bonded to the polymer layer. The seal 218, which may be a hermetic seal, is formed on the side wall 208 around the open space 210. In some embodiments, the seal 218 includes a polymer disposed on the side wall 208. The receptacle 204 and the lid 206 are analogous to the receptacle 104 and the lid 106 described in relation to FIGS. 1A-1H.

The battery 200 also includes the electrode assembly 202. The electrode assembly 202 is disposed within the open space 210 and comprises an anode electrode (or anode) and a cathode electrode (or cathode). A separator may be interposed between each junction defined by an adjacent anode and cathode electrodes. The separator may be a microporous polymer membrane or non-woven fabric mat. The lid 206 is configured to accommodate a swelling of the electrode assembly 202 up to 15%. The receptacle 204 is configured to strain less than the lid 206 during the swelling of the electrode assembly 202.

An insulating layer 222 may be disposed between the electrode assembly 202 and at least the receptacle 204. It will be appreciated that the electrode assembly 202 may be a stack of layers, such as layers of separator that are interposed between alternating layers of anode electrode and cathode electrode. FIG. 2B depicts the electrode assembly 202 as having a planar configuration. However, this depiction is not intended as limiting. Other configurations are possible such as a wound configuration or "jelly roll". In some embodiments, such as shown in FIGS. 1A & 1B, the electrode assembly 202 corresponds to a plurality of electrode assemblies 202. In these embodiments, individual members of the plurality of electrode assemblies 202 may be electrically-coupled to each other in series, in parallel, or any combination thereof.

The feedthrough 214 is coupled to the anode electrode or the cathode electrode. A remaining electrode may be coupled to a second feedthrough, or alternatively, to the receptacle 204. For the latter, the receptacle 204 is formed of electrically-conductive material. For example, and without limitation, the anode electrode may be coupled to the feedthrough 214 and the cathode electrode may be coupled to the second feedthrough (or vice versa). In another non-limiting example, the anode electrode may be coupled to the feedthrough 214 and cathode electrode may be coupled to the receptacle 204 (or vice versa). The receptacle 204 may be formed of metal, such as aluminum or an aluminum alloy. In embodiments having the plurality of electrode assemblies 202, the feedthrough 214 may be a common feedthrough. The common feedthrough is configured to couple to each of the anode electrodes or the cathode electrodes. The second feedthrough, or alternatively, the side wall 208 may similarly be shared in common.

The battery 200 may be any type of battery capable of storing or supplying electrical power via an electrode assembly. Non-limiting examples of such batteries include alkaline batteries, zinc-carbon batteries, silver-zinc batteries, nickel-cadmium batteries, nickel metal hydride batteries, lithium-ion batteries, and lithium polymer batteries. However, in many embodiments, the battery 200 corresponds to a lithium-ion battery. In these embodiments, the anode active material may include graphite, carbon black, silicon, or some combination thereof. The cathode active material may include a lithium metal oxide. Non-limiting examples of the lithium metal oxide include compositions represented by $Li_\alpha MO_\delta$ and $Li_2MeO_3.Li_\alpha MO_\delta$. Here, Me is any combination of quadrivalent metals, M is any combination of univalent, divalent, trivalent, or quadrivalent metals, $0.90 \leq \alpha \leq 2$, and $1.90 \leq \beta \leq 3$. Representative examples of Me include Ti, Mn, Zr, Mo, and Ru. Representative examples of M include B, Na, Mg, Ti, Ca, V, Cr, Mn, Fe, Co, Ni, Cu, Zn, Al, Sc, Y, Ga, and Zr. In some instances, the lithium metal oxide includes at least one of Co, Mn, and Ni. The anode current collector may include copper or copper foil, and the cathode current collector may include aluminum or aluminum foil.

The battery 200 may also include an electrolyte capable of transporting lithium ions through the separator and between the anode electrode and the cathode electrode. The electrolyte may be a liquid solvent or a gel polymer. Representative examples of the liquid solvent include an organic carbonate (e.g., ethylene carbonate, dimethyl carbonate, diethyl carbonate, ethyl-methyl carbonate, etc.), an ionic liquid (e.g., 1-butyl-3-methylimidazolium hexafluorophosphate, 1-ethylpyridinium tetrafluoroborate, etc.), or some combination thereof. Representative examples of the gel polymer include polymeric hosts such as polyethylene oxide (PEO), polyacrylonitrile (PAN), polymethylmethacrylate (PMMA), and polyvinylidene fluoride (PVdF). In many instances, the electrolyte includes a lithium salt. Non-limiting examples of the lithium salt include $LiPF_6$, $LiBF_4$, $LiClO_4$, $LiSO_3CF_3$, $LiN(SO_2CF_3)_2$, $LiBC_4O_8$, $Li[PF_3(C_2F_5)_3]$, and $LiC(SO_2CF_3)_3$. Other lithium salts are possible, including combinations of lithium salts. It will be appreciated that the electrolyte permeates the anode active material of the anode electrode, the cathode active material of the cathode electrode, and the separator.

In some embodiments, the electrode assembly 202 and the lid 206 are separated by a gap. The gap may correspond to a "head space" within the battery 200 and may allow the electrode assembly 202 to swell partially or fully before contacting the lid 206. In embodiments having the plurality of electrode assemblies 202, the gap may be referenced against an electrode assembly closest the lid 206. In some embodiments, such as shown in FIG. 2B, the electrode assembly 202 and the lid 206 have no gap therebetween.

In some embodiments, the gap is no greater than 15% of an initial thickness of the electrode assembly 202. In some embodiments, the gap is no greater than 12% of an initial thickness of the electrode assembly 202. In some embodiments, the gap is no greater than 9% of an initial thickness of the electrode assembly 202. In some embodiments, the gap is no greater than 6% of an initial thickness of the electrode assembly 202. In some embodiments, the gap is no greater than 3% of an initial thickness of the electrode assembly 202. In some embodiments, the gap is no greater than 1% of an initial thickness of the electrode assembly 202.

In some embodiments, the gap is at least 0.5% of an initial thickness of the electrode assembly 202. In some embodiments, the gap is at least 1% of an initial thickness of the electrode assembly 202. In some embodiments, the gap is at least 3% of an initial thickness of the electrode assembly 202. In some embodiments, the gap is at least 6% of an initial thickness of the electrode assembly 202. In some embodiments, the gap is at least 9% of an initial thickness of the electrode assembly 202. In some embodiments, the gap is at least 12% of an initial thickness of the electrode assembly 202.

It will be understood that the upper and lower limits may be combined in any variation as above to define a range for the gap. For example, and without limitation, the gap may be at least 3% of an initial thickness of the electrode assembly 202 but no greater than 6%. In another non-limiting example, the gap may be at least 9% of an initial thickness of the electrode assembly 202 but no greater than 15%. Other ranges are possible. In embodiments having the plurality of electrode assemblies 202, the initial thickness corresponds to a cumulative (or total) thickness of the plurality of electrode assemblies 202.

The seal 218 may include structural features that extend past an outer periphery of the side wall 208. In some embodiments, the receptacle 204 and the lid 206 are coupled via mating flanges configured to form the seal 218. In some embodiments, such as shown in FIGS. 2A & 2B, the lid 206 includes a portion 230 folded over an edge 226 of the side wall 208 and sealed to an exterior surface 228 thereof. The extension of these structural features may be characterized by a distance measured perpendicular to the exterior surface 228. It will be appreciated that the distance may be selected to reduce a protrusion of the seal 218 into space adjacent the battery 200. Such reduction may improve a utilization of space within a target application (e.g., within an electronic device, a battery bank, etc.).

In some embodiments, the distance is no greater than 12 mm. In some embodiments, the distance is no greater than 10 mm. In some embodiments, the distance is no greater than 8 mm. In some embodiments, the distance is no greater than 6 mm. In some embodiments, the distance is no greater than 4 mm. In some embodiments, the distance is no greater than 3 mm. In some embodiments, the distance is no greater than 2 mm. In some embodiments, the distance is no greater than 1 mm.

In some embodiments, the distance is no less than 0.5 mm. In some embodiments, the distance is no less than 1 mm. In some embodiments, the distance is no less than 2 mm. In some embodiments, the distance is no less than 3 mm. In some embodiments, the distance is no less than 4 mm. In some embodiments, the distance is no less than 6 mm. In some embodiments, the distance is no less than 8 mm. In some embodiments, the distance is no less than 10 mm.

It will be understood that the upper and lower limits may be combined in any variation as above to define a range for the distance. For example, and without limitation, the distance may range from no less than 8 mm to no greater than 12 mm. In another non-limiting example, the distance may range from no less than 0.5 mm to no greater than 5 mm. Other ranges are possible. In some embodiments, the lid 206, when coupled to the receptacle 204, does not extend past an outer periphery of the side wall 208 (i.e., the distance is zero).

In some embodiments, the battery 200 includes a gas release valve disposed through the side wall 208. The gas release valve is operable to vent gas (or fluid) from within the battery 200, and some variations, may prevent the seal 218 from experiencing pressures that would exceed its burst strength.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A battery pack, comprising:
   a plurality of electrode assemblies, each electrode assembly of the plurality of electrode assemblies comprising a cathode and an anode;
   a receptacle comprising at least one feedthrough disposed through one or more sides of the receptacle; and
   a lid sealed to the receptacle;
   wherein the receptacle, the at least one feedthrough, and the lid form a sealed volume in which the plurality of electrode assemblies and an electrolyte are disposed;
   wherein the lid is configured to displace from a first position to a second position in response to a swelling of at least one electrode assembly of the plurality of electrode assemblies within the sealed volume; and
   wherein the receptacle is configured to strain less than the lid during the swelling of the at least one electrode assembly.

2. The battery pack of claim 1, wherein the second position of the lid corresponds to an expanded volume of the plurality of electrode assemblies that is 15% greater than an initial volume of the plurality of electrode assemblies.

3. The battery pack of claim 2, wherein the plurality of electrode assemblies and the lid are separated by a gap no greater than 15% of an initial thickness of the plurality of electrode assemblies.

4. The battery pack of claim 1, wherein the lid defines an undulating section that expands from the first position to the second position.

5. The battery pack of claim 1, wherein the lid includes a flexible element to expand from the first position to the second position.

6. The battery pack of claim 1, further comprising a seal between the lid and the receptacle.

7. The battery pack of claim 6, wherein the seal is formed between the lid and an edge of the receptacle.

8. The battery pack of claim 6, wherein a seal is formed between the lid and an exterior surface of the receptacle.

9. The battery pack of claim 6, wherein a seal is formed between the lid and an interior surface of the receptacle.

10. The battery pack of claim 1, wherein the receptacle is configured to strain no greater than 0.1% during the swelling of the at least one electrode assembly.

11. A method for manufacturing a battery pack, the method comprising:
    disposing a plurality of electrode assemblies within a receptacle, each electrode assembly of the plurality of electrode assemblies comprising a cathode and an anode, wherein the receptacle comprises at least one feedthrough disposed through one or more sides of the receptacle; and
    sealing a lid to the receptacle, wherein the receptacle, the at least one feedthrough, and the lid form a sealed volume in which the plurality of electrode assemblies and an electrolyte are disposed;
    wherein the lid is configured to displace from a first position to a second position in response to a swelling of at least one electrode assembly of the plurality of electrode assemblies within the sealed volume; and
    wherein the receptacle is configured to strain less than the lid during the swelling of the at least one electrode assembly.

12. The method of claim 11, wherein the second position of the lid corresponds to an expanded volume of the plurality of electrode assemblies that is 15% greater than an initial volume of the plurality of electrode assemblies.

13. The method of claim 11, wherein the plurality of electrode assemblies and the lid are separated by a gap no greater than 15% of an initial thickness of the plurality of electrode assemblies.

14. The method of claim 11, wherein the lid comprises an undulating section that expands from the first position to the second position.

15. The method of claim 11, wherein the lid comprises a flexible element to expand from the first position to the second position.

16. The method of claim 11, further comprising a seal between the lid and the receptacle.

17. The method of claim 16, wherein the seal is formed between the lid and an edge of the receptacle.

18. The method of claim 16, wherein a seal is formed between the lid and an exterior surface of the receptacle.

19. The method of claim 16, wherein a seal is formed between the lid and an interior surface of the receptacle.

20. The method of claim 11, wherein the receptacle is configured to strain no greater than 0.1% during the swelling of the at least one electrode assembly.

* * * * *